United States Patent [19]
Essman

[11] Patent Number: 5,975,490
[45] Date of Patent: Nov. 2, 1999

[54] SWIVEL COUPLING FOR HOSE

[75] Inventor: John F. Essman, Bryan, Ohio

[73] Assignee: Essman Screw Products, Inc., Bryan, Ohio

[21] Appl. No.: 09/003,669

[22] Filed: Jan. 7, 1998

[51] Int. Cl.⁶ ................................................. F16L 37/28
[52] U.S. Cl. ........................................ 251/149.4; 285/261
[58] Field of Search .................... 251/149.2, 149.4, 251/149.6, 149.9; 285/261, 271, 138.1; 137/616.7

[56]  References Cited

U.S. PATENT DOCUMENTS

| | | | |
|---|---|---|---|
| 1,532,195 | 4/1925 | Morrison | 285/261 |
| 2,421,691 | 6/1947 | Gibson, Jr. et al. | 285/261 |
| 3,592,439 | 7/1971 | Ritchie, Jr. | 251/149.4 X |
| 4,662,396 | 5/1987 | Avnon | 251/149.9 X |
| 5,326,072 | 7/1994 | Wuthrich | 251/149.2 |
| 5,560,548 | 10/1996 | Mueller et al. | 251/149.6 X |

OTHER PUBLICATIONS

See Figure 1 of Patent Specification.

*Primary Examiner*—Kevin Lee
*Attorney, Agent, or Firm*—Geoffrey A. Mantooth

[57]  ABSTRACT

A coupling is provided between a hose and a fitting, such as can be used to connect to an air conditioning system. The coupling has a stem with a channel extending between first and second ends. The first end of the stem is provided with a nut for securing to the fitting, which fitting can be on the air conditioning system or on a service unit. The second end has a socket for receiving a ball and end of a nipple. The nipple is secured to the hose. The ball and socket arrangement allows the nipple and the hose to rotate 360 degrees around a longitudinal axis of the stem, as well as pivot with respect to the stem.

5 Claims, 3 Drawing Sheets

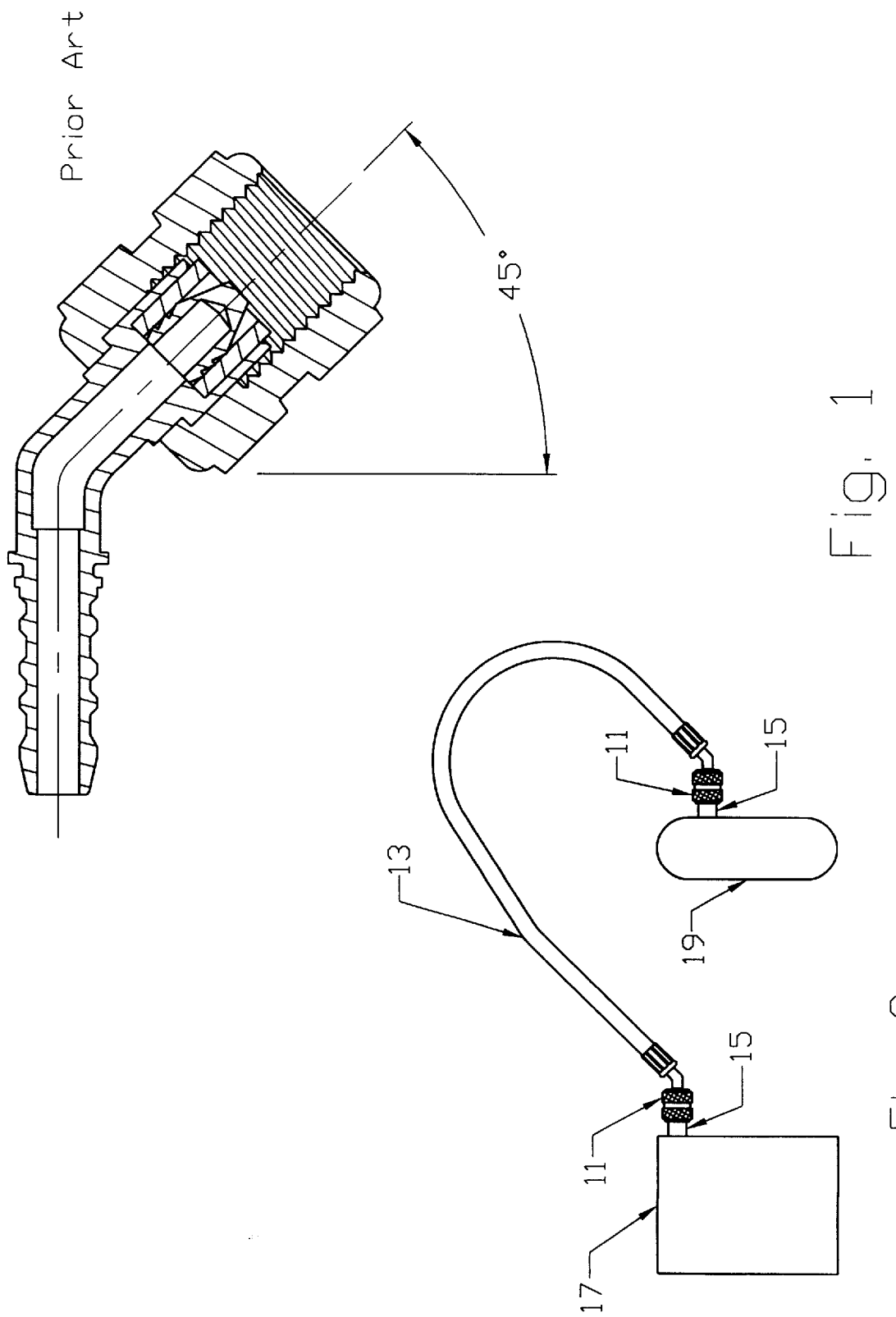

SWIVEL COUPLING FOR HOSE

FIELD OF THE INVENTION

The present invention relates to couplings for hoses, such as hoses that are used to charge refrigeration systems with refrigerant.

BACKGROUND OF THE INVENTION

Automotive air conditioning systems often need to be recharged with refrigerant. To recharge, hoses are coupled to an air conditioning system by way of fittings. The hoses typically couple the air conditioning system to a service unit. The service unit contains a supply of refrigerant, as well as pressure gauges and valves for controlling the flow of refrigerant.

The fittings in an automobile can be difficult to couple hoses to. The fittings are typically threaded and the hoses are provided with nuts that are screwed onto the fittings. Many engine compartments are cramped, with the fittings located in hard to reach places. It can be difficult to thread a nut onto a fitting, which nut is on the end of a hose, especially in a cramped location. Frequently, only one hand can be used.

In the prior art, one type of coupling that alleviates some of the problems associated with coupling to a fitting in a cramped place is a bent barb coupling shown in FIG. 1. One end of the hose is connected to the barbed section. The nut is threaded onto the fitting of the air conditioning system. The barbed section is angled about 45 degrees from the nut section. This bent coupling eases the connection of the hose to a fitting in many instances.

The prior art bent coupling suffers from many disadvantages. For instance, when the nut on the coupling is tightened, the hose may twist and kink. This is caused by the end of the hose rotating with the nut. Untwisting the hose is difficult, especially in a cramped space. Furthermore, the hose may be at an awkward angle, pointing away from a desired path. To reorient the hose, the nut be loosened, and the hose angle adjusted. Loosening the nut causes some refrigerant to escape into the atmosphere. It is widely believed that refrigerants cause damage to atmospheric gasses.

Manufacturing the prior art bent coupling presents problems as well. The passageway through the center of the coupling is difficult to machine on center. Also, the coupling is machined in a straight configuration. After being machined, it is bent to form the angle. Bending the coupling requires the coupling to be heat treated (900 degrees Fahrenheit for one hour), followed by a bright dip operation. Bright dipping utilizes copper sulfate, which presents disposal problems due to environmental concerns (copper sulfate is a heavy metal). Furtherstill, bending the coupling can cause failure of the coupling. About 5–10% of the couplings that are bent crack and leak. These cracks are usually detected at the final check of the couplings. These couplings must be thrown away. Sometimes, the cracks manifest themselves after the final check and during operation.

SUMMARY OF THE INVENTION

It is an object of the present invention to provide a hose coupling which does not suffer from the disadvantages from prior art bent couplings.

The present invention provides a coupling for a hose. The coupling has a body, a tubular member, and a seal. The body has first and second end portions, with the first end portion being structured and arranged to couple to a fitting. The second end portion is opposite the first end portion. The body has a first channel that communicates between the first and second end portions. The tubular member has first and second end portions, with the tubular member first end portion being structured and arranged to be coupled to a hose. The tubular member second end portion is pivotally coupled to the body second end portion. The tubular member has a second channel that communicates between the tubular member first and second end portions. The second channel communicates with the first channel. The seal is between the tubular member second end and the body second end.

In one aspect of the present invention, the tubular member second end portion and the body second end portion make up a ball and socket arrangement.

In another aspect of the present invention, the coupling includes a nut that is rotatably coupled to the body first end portion. The nut is structured and arranged to couple to the fitting. In still another aspect of the present invention the tubular member first end portion includes a barbed nipple. Also the body first end portion includes a depressor.

In still another aspect of the present invention, the body includes a valve located in the first channel. The valve is movable between open and closed positions with the valve including a depressor that is structured and arranged to cooperate with the fitting when the hose coupling is coupled to the fitting.

In another aspect of the present invention, the coupling includes a stem, a nut, a nipple, and a retainer. The stem has first and second ends and a stem channel extending between the first and second ends. The first end has a depressor therein and a first seal. The second end forms a socket. The nut is rotatably mounted onto the first end of the stem. The nut is structured and arranged to couple to a fitting. The nipple has first and second ends and a nipple channel extending between the nipple first and second ends. The nipple second end includes a ball that is located within the socket. The nipple first end has an outside diameter structured and arranged for retaining a hose thereon. There is a second seal that is between the ball and the socket. The retainer is coupled to the stem second end, with the ball being interposed between the stem and the retainer, wherein the nipple can pivot with respect to the stem.

In one aspect of the invention, the coupling includes a valve in the stem channel, the valve being movable between open and closed positions.

BRIEF DESCRIPTION OF THE DRAWINGS

FIG. 1 is a longitudinal cross-sectional view of a prior art bent hose coupling.

FIG. 2 is a schematic view of a service arrangement, utilizing the swivel coupling of the present invention.

DESCRIPTION OF THE PREFERRED EMBODIMENTS

Figure 3:
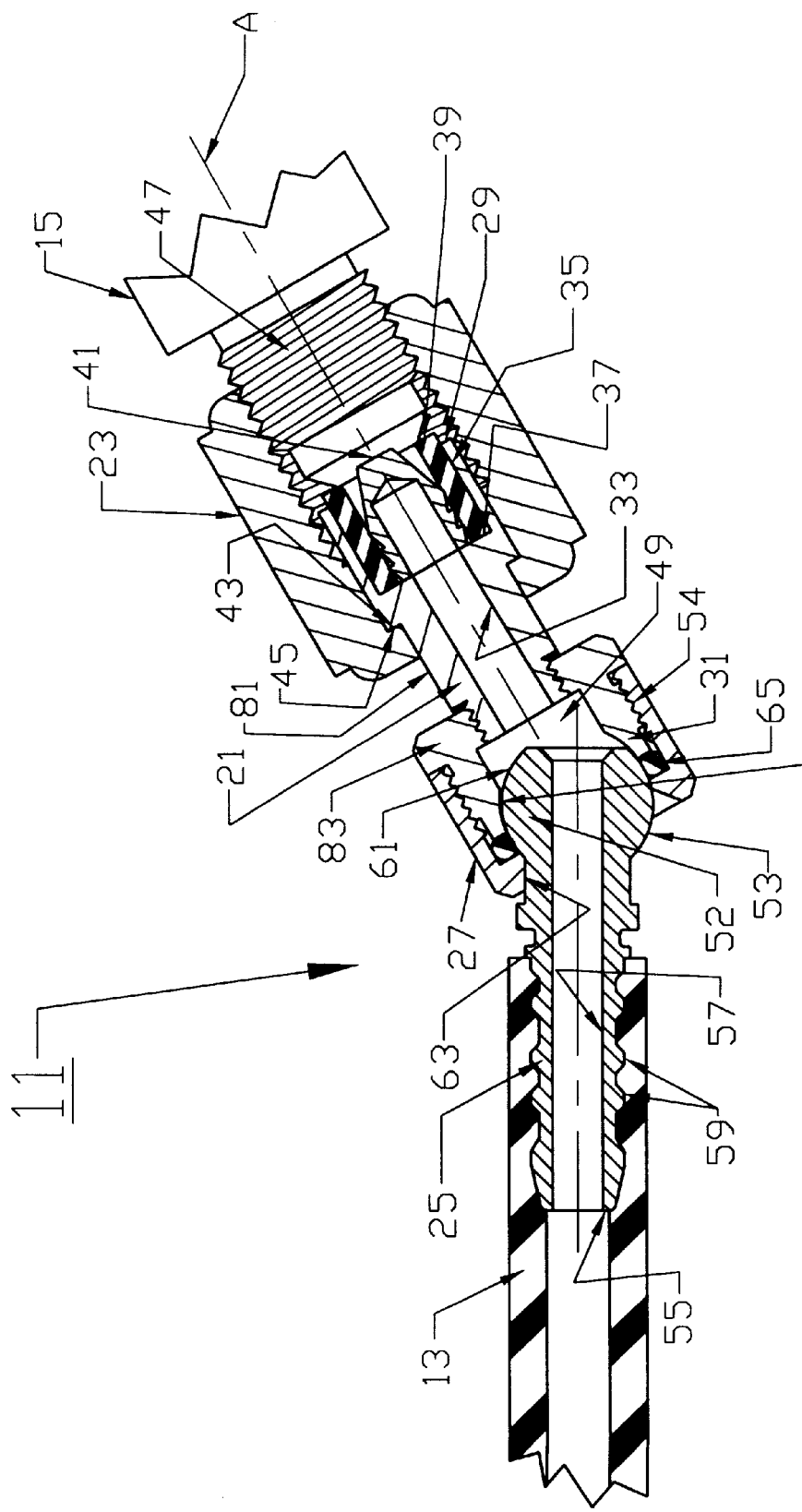
FIG. 3 is a longitudinal cross-sectional view of a swivel hose coupling of the present invention, in accordance with a preferred embodiment.

Referring to FIG. 2, the swivel coupling 11 is used to connect a hose 13 to a fitting 15. The hose 13 typically extends between the coupling 11 and a service unit 17. The service unit 17 contains a reservoir of gas, such as refrigerant, as well as conduits and valves. The fitting 15 provides a port into (or out of) an air conditioning system 19 such as is found on an automobile. In the preferred embodiment, the fitting 15 is threaded.

Referring to FIG. 3, the swivel coupling 11 includes a stem 21, a nut 23, a nipple 25, and a retainer nut 27.

The stem 21 is generally tubular having first and second ends 29, 31. A channel or bore 33 extends between the first and second ends 29, 31. At the first end 29, the channel enlarges due to a counterbore 35. The counterbore 35, which forms a shoulder 37, receives a tubular seal 39. The seal 39 receives a depressor 41. Both the seal 39 and the depressor 41 bear on the shoulder 37. The depressor 41 points away from the second end 31. The depressor 41 has openings (not shown) therein to allow the flow of fluid therethrough.

The outside diameter of the first end 29 of the stem 21 is smooth. The nut 23, which is tubular, is located around the outside diameter of the stem first end 29. Both the nut 23 and the stem 21 have cooperating shoulders 43, 45 that prevent the nut from sliding off of the stem first end. The nut 23 has interior threads 47 to engage the threads on the fitting 15.

The second end 31 of the stem also has a counterbore 49 therein. The counterbore forms a cavity having an open end. The open end of the counterbore 49 has an arcuate surface 51 around the inner circumference. The counterbore 49 and the arcuate surface 51 form a socket 52 for receiving a ball 53. The outside diameter of the second end 31 is threaded 54 to receive the retainer nut 27.

The nipple 25 has first and second ends 55, 53, and a channel 57 or passageway that extends between the two ends. The channel 57 communicates with the stem channel 33 by way of the counterbore 49. The second end 53 of the nipple is spherical in its outside dimensions. The nipple second end 53 is received by the arcuate surface 51 of the stem 21. The nipple second end 53 and the stem second end 31 form a ball and socket arrangement, wherein the nipple 25 can pivot and rotate with respect to the stem 21.

The first end 55 of the nipple 25 is provided with circumferential projections 59 around the outside diameter. There are projections 59 from the first end to the middle portion of the nipple. Some of the projections are barbed slightly, such that with the hose 13 installed onto the nipple, it is difficult to pull the hose off.

The retainer nut 27 is cup shaped with interior threads 61 that engage the exterior threads 54 of the stem 54. The end of the retainer nut 27 has an opening 63 for receiving the nipple 25.

An o-ring seal 65 is located around the ball 53 and between the retaining nut 27 and the stem second end 31.

To configure the coupling 11 for use, a hose 13 is slid onto the nipple 25. A band clamp (not shown) can be used to secure the hose to the nipple. The coupling is now ready for use.

To use the coupling 11, the operator grips it and positions it next to a fitting. The nut 23 is then screwed onto the fitting 15.

The ball and socket arrangement 53, 51 allows the stem 21 to move to an angle relative to the hose 13. The stem 21 has a longitudinal axis A extending along the center of the channel 33. The nipple can move to form an angle with the stem longitudinal axis. In addition, the nipple can rotate 360 degrees about the longitudinal axis A of the stem. This simplifies the installation of the coupling 11 onto the fitting. As the nut 23 is rotated onto the fitting 15, there is a tendency for the stem 21 to rotate as well. With the ball and socket arrangement, the nipple 25 can rotate independently of the stem 21. Thus, if the stem rotates while the nut is screwed onto the fitting, the nipple and hose do not rotate. This prevents the hose from assuming awkward orientations and from kinking or twisting.

The depressor 41 contacts a Schraeder valve inside of the fitting 15, thereby opening the valve. Refrigerant can flow through the hose 13, the coupling 11, and the fitting 15. The refrigerant flows through the nipple channel 57 and the stem channel 33.

The o-ring 65 around the ball 53 is lubricated by the refrigerant. Consequently, the ball 53 will move smoothly inside of the socket and the o-ring will not dry out to cause binding.

Figure 4:
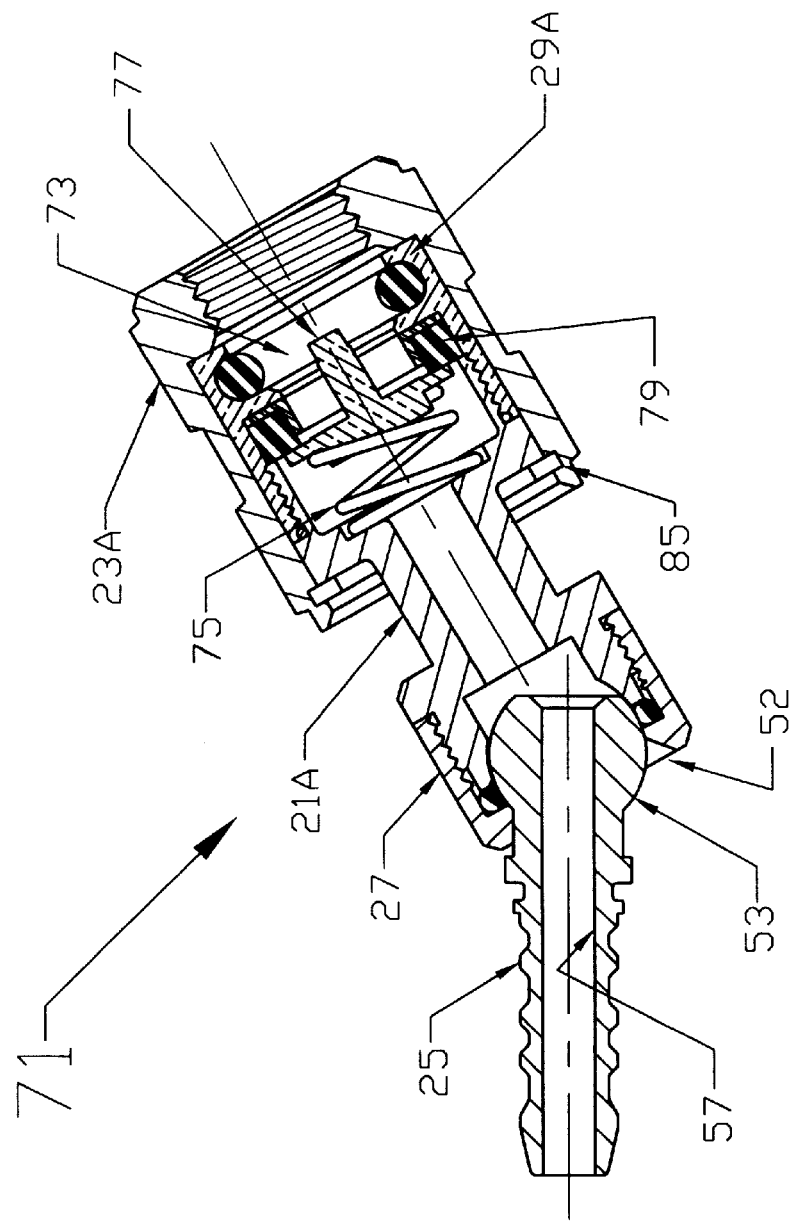
FIG. 4 is a longitudinal cross-sectional view of the swivel hose coupling, in accordance with another embodiment.

FIG. 4 shows a coupling 71 in accordance with another embodiment. The coupling 71 has a valve 73 located in the first end 29A of the stem 21A. The valve 73 is commonly referred to as an antiblowback valve in the industry. When the coupling 71 is not coupled to a fitting 15, a spring 75 forces a depressor 77 against a gasket 79. The depressor 77 has no openings therein. Thus, any refrigerant that is in the remainder of the coupling, or in the hose, is prevented from leaking out of the coupling. When the coupling 71 is mounted onto the fitting 15, the fitting valve pushes the depressor 77 back from the gasket 79, forming an opening for the refiigerant to flow through.

The coupling 71 of FIG. 4 also differs from the coupling 11 of FIG. 3 by the stem 21A. In FIG. 3, the stem 21 is actually shown as two pieces 81, 83. The piece 83 forming the second end is threaded onto the remainder 81 of the stem 21. In FIG. 4, the stem 21A is a single piece. The nut 23A is retained on the stem 21A by way of a snap ring 85.

With the coupling 11, 71 of the present invention, installation onto a fitting is much easier, especially in tight quarters. The coupling is not fixed at a certain angle with respect to the hose. The nipple 25 can pivot relative to the longitudinal axis of the stem 21, 21A between 0 degrees to 45 degrees (or greater depending on the stop surfaces provided by the retaining nut 27). Also, the nipple can rotate 360 degrees around the longitudinal axis of the stem.

The coupling 11, 71 of the present invention can be used on either end of the hose 13. It can be used at the air conditioning system fitting or at a fitting on the service unit (see FIG. 2).

Also, because the parts and the coupling need not be bent during manufacture, a major source of product failures (including leaks) has been eliminated.

The foregoing disclosure and the showings made in the drawings are merely illustrative of the principles of this invention and are not to be interpreted in a limiting sense.

I claim:

1. A coupling for a hose, comprising:

a) a body having first and second end portions, with the first end portion being structured and arranged to couple to a fitting, the second end portion being opposite of the first end portion, the body having an imperforate wall forming a first channel that communicates between the first and second end portions;

b) a tubular member having first and second end portions, with the tubular member first end portion being structured and arranged to be coupled to a hose, the tubular member second end portion being pivotally coupled to the body second end portion, the tubular member having a second channel that communicates between the tubular member first and second end portions, the second channel communicating with the first channel regardless of the pivotal orientation of the tubular member with respect to the body;

c) a seal between the tubular member second end and the body second end;

d) a nut that is rotatably coupled to the body first end portion, the nut being structured and arranged to couple to the fitting, the seal being independent of the nut.

2. A coupling for a hose, comprising:

a) a body having first and second end portions, with the first end portion being structured and arranged to couple to a fitting, the second end portion being opposite of the first end portion, the body having an imperforate wall forming a first channel that communicates between the first and second end portions;

b) a tubular member having first and second end portions, with the tubular member first end portion being structured and arranged to be coupled to a hose, the tubular member second end portion being pivotally coupled to the body second end portion, the tubular member having a second channel that communicates between the tubular member first and second end portions, the second channel communicating with the first channel regardless of the pivotal orientation of the tubular member with respect to the body;

c) a seal between the tubular member second end and the body second end;

d) the body first end portion comprises a depressor.

3. A coupling for a hose, comprising:

a) a body having first and second end portions, with the first end portion being structured and arranged to couple to a fitting, the second end portion being opposite of the first end portion, the body having an imperforate wall forming a first channel that communicates between the first and second end portions;

b) a tubular member having first and second end portions, with the tubular member first end portion being structured and arranged to be coupled to a hose, the tubular member second end portion being pivotally coupled to the body second end portion, the tubular member having a second channel that communicates between the tubular member first and second end portions, the second channel communicating with the first channel regardless of the pivotal orientation of the tubular member with respect to the body;

c) a seal between the tubular member second end and the body second end;

d) the body comprises a valve located in the first channel, the valve being movable between opened and closed positions, the valve comprising a depressor that is structured and arranged to cooperate with the fitting when the lose coupling is coupled to the fitting.

4. A coupling for a hose, comprising:

a) a stem having first and second ends and an imperforate wall forming a stem channel extending between the first and second ends, the first end having a depressor therein and a first seal, the second end forming a socket;

b) a nut rotatably mounted onto the stem first end, the nut being structured and arranged to couple to a fitting;

c) a nipple having first and second ends and a nipple channel extending between the nipple first and second ends, the nipple second end comprising a ball that is located within the socket, the nipple channel communicating with the stem channel;

d) a retainer that is coupled to the stem second end, with the ball being interposed between the stem and the retainer, wherein the nipple can pivot with respect to the stem, fluid flow through the coupling being independent of the retainer;

e) a second seal around the ball and between the retainer and the stem.

5. The hose coupling of claim 4, further comprising a valve in the stem channel, the valve being movable between open and closed positions.

* * * * *